(12) United States Patent
Makovetski et al.

(10) Patent No.: US 7,666,541 B2
(45) Date of Patent: Feb. 23, 2010

(54) ULTRASONIC METAL WELDING TECHNIQUES AND BATTERIES MANUFACTURED USING SUCH TECHNIQUES

(75) Inventors: Boris Makovetski, Danbury, CT (US); Robert Foster, Milford, CT (US); Fred J. Berkowitz, New Milford, CT (US); Jaroslav Janik, Southbury, CT (US); Mark C. Brown, Brookfield, CT (US)

(73) Assignee: The Gillette Company, Boston, MA (US)

( * ) Notice: Subject to any disclaimer, the term of this patent is extended or adjusted under 35 U.S.C. 154(b) by 557 days.

(21) Appl. No.: 11/592,628

(22) Filed: Nov. 3, 2006

(65) Prior Publication Data

US 2008/0131758 A1    Jun. 5, 2008

(51) Int. Cl.
*H01M 2/08* (2006.01)
*H01M 2/12* (2006.01)
*B23K 1/06* (2006.01)

(52) U.S. Cl. .................. 429/56; 429/174; 29/623.2; 29/623.4; 228/1.1; 228/110.1

(58) Field of Classification Search .................. 429/56, 429/61, 174; 29/623.2, 623.4; 228/1.1, 110.1
See application file for complete search history.

(56) References Cited

U.S. PATENT DOCUMENTS

| 3,897,270 | A |   | 7/1975  | Rosansky ............... 429/56 |
| 4,527,727 | A |   | 7/1985  | Renshaw ............... 228/1.1 |
| 5,702,840 | A | * | 12/1997 | Byon .................. 429/56 X |
| 5,772,100 | A |   | 6/1998  | Patrikios .............. 228/1.1 |
| 5,795,674 | A |   | 8/1998  | Shiota ................. 429/54 |
| 5,853,912 | A | * | 12/1998 | Naing et al. ........... 429/61 |
| 6,063,518 | A | * | 5/2000  | Dewulf et al. ......... 429/56 X |
| 6,247,628 | B1|   | 6/2001  | Sato et al. ........... 228/1.1 |
| 6,523,732 | B1| * | 2/2003  | Popoola et al. ........ 228/1.1 |
| 6,691,909 | B2| * | 2/2004  | Skogsmo et al. ...... 228/1.1 X |
| 2006/0078787 | A1 |   | 4/2006  | Sato et al. ........... 429/62 |

FOREIGN PATENT DOCUMENTS

| EP | 0 689 255 A2 | 12/1995 |
| EP | 0 782 204 A1 | 7/1997  |
| EP | 0 818 838 A2 | 1/1998  |
| EP | 1 357 615 A1 | 10/2003 |
| FR | 2 756 421    | 5/1998  |

* cited by examiner

*Primary Examiner*—Stephen J. Kalafut
(74) *Attorney, Agent, or Firm*—Fish & Richardson P.C.

(57) ABSTRACT

Batteries are disclosed having a vent opening that is sealed by a metal foil. Methods and tooling for manufacturing such batteries and methods of venting sealed batteries are also disclosed. In some implementations, sealing is performed using ultrasonic metal welding.

43 Claims, 13 Drawing Sheets

ULTRASONIC METAL WELDING TECHNIQUES AND BATTERIES MANUFACTURED USING SUCH TECHNIQUES

TECHNICAL FIELD

This invention relates to ultrasonic metal welding techniques, and batteries manufactured using such techniques.

BACKGROUND

Under certain conditions, gas can accumulate in the interior of a battery. If there is no way for this gas to escape from the battery housing, pressure build-up may eventually cause the battery to explode.

Various vents have been employed to allow gas to escape from a battery at a predetermined burst pressure. Vent designs include openings that are normally sealed with valves, diaphragms and gaskets. It is important that the vent be sealed from the ambient atmosphere until the burst pressure is reached, to prevent ingress of water, air and other contaminants into the battery.

Some types of batteries include a coined area in the housing that has a reduced wall thickness designed to burst when a predetermined pressure is reached within the battery housing. However, this vent design is difficult to implement in batteries where venting must occur at relatively low pressures at which the shear stress is insufficient to break the thinned wall. Moreover, it may be problematic to precisely control wall thickness using a coining process.

SUMMARY

The following disclosure features batteries, e.g., cylindrical batteries, that include a sealed metal housing having a vent opening, for example in the contact cup of the battery, and a foil vent sealed to the housing so as to seal the vent opening. The disclosure also features methods of sealing the foil vent to the contact cup utilizing ultrasonic welding.

Advantageously, the seal between the foil vent and the contact cup is hermetic, preventing intrusion of moisture or contaminants into the battery prior to the seal being broken. Moreover, in many cases the methods described herein allow the seal to be produced in a manner so that it exhibits a burst pressure within a relatively narrow predetermined range. In addition, the welding processes described herein introduce minimal (if any) internal stress, and thus do not significantly alter or damage the crystal structure of the metal. As a result, in preferred embodiments the weld exhibits electrical conductivity substantially equal to that of the surrounding metal.

In one aspect, the invention features a sealed battery that includes (a) active battery components, including a positive electrode, a negative electrode, a separator interposed between the positive and negative electrodes, and an electrolyte solution; (b) a metal housing defining an interior cavity containing the active battery components; (c) a contact cup joined sealingly to an end of the metal housing, the contact cup including a vent hole; and (d) a foil, attached to the contact cup so as to seal the vent hole.

In some implementations, the battery includes one or more of the following features. The foil is attached to the contact cup by a weld. The weld is generally circular. The foil has a thickness of from about 0.02 to 0.25 mm. The foil is configured to rupture when a predetermined pressure is reached within the interior cavity. The contact cup and foil are formed of non-ferrous metals. The metal housing is generally cylindrical. The weld forms a hermetic seal. The metal contact cup contains an opening, and the sealing step comprises sealing around the perimeter of the area in which the opening is defined.

In another aspect, the invention features a method of manufacturing a sealed battery, including: (a) providing a metal contact cup defining at least one vent opening; (b) sealing a foil to the contact cup so as to seal the opening; (c) providing a battery housing; and (d) joining the contact cup to the housing.

In some implementations, the method includes one or more of the following features. The sealing step comprises welding the foil to the contact cup. Welding comprises ultrasonic metal welding utilizing a sonotrode having at least one weld lobe. Welding comprises forming a circular weld. Welding is conducted in a manner so as to form a hermetic seal. The metal contact cup defines an opening, and the sealing step comprises sealing around the perimeter of the area in which the opening is defined. Ultrasonic metal welding may be conducted using a full wave sonotrode. Ultrasonic metal welding is performed using a weld pattern that includes one or more groove(s) and/or knurls. The method further comprises optimizing the geometry of the grooves so that the internal volume of the groove(s) ($V_g$) is preferably greater than the volume of material displaced during welding. Ultrasonic metal welding is performed using a weld nest that holds the contact cup during welding, and may allow the contact cup to move laterally during the initial phase of welding, before the welding process has stabilized. Ultrasonic metal welding is performed using a spherical nodal support with a point contact to minimize deflection of the sonotrode. The weld nest holds the contact cup loosely to dynamically compensate for camber of the contact cup. The nodal support is positioned so that the point contact coincides with a plane through the longitudinal axis of the weld lobe and the longitudinal axis of the sonotrode. The method further includes assembling the contact cup and vent into a cap assembly. The cap assembly further comprises a PTC device and a spacer interposed between the PTC device and the foil, the spacer including an aperture which defines the surface area of the foil that is exposed to pressure. The weld nest has a smooth surface, e.g., at least a polished surface. By "at least a polished surface," we mean that the surface may be smoother than polished, e.g., honed or otherwise processed to give an extremely smooth surface. The foil has a predetermined thickness, and the method further comprises, during ultrasonic metal welding, holding the opposed surfaces of the foil and contact cup sufficiently parallel so that the deviation from parallelism is less than 10% of the thickness of the foil. The weld lobe includes a resilient gasket.

In a further aspect, the invention features a method of venting a sealed battery, including: (a) providing the battery housing with a vent opening; (b) sealing the vent opening with a metal foil; (c) configuring the metal foil so that it will rupture when a predetermined pressure is reached within the sealed battery; and (d) selecting process parameters for the sealing step so that the seal will be hermetic as long as the pressure within the sealed battery is at or below the predetermined pressure.

In some implementations, the configuring step includes selecting the thickness of the foil. The configuring step may also, or alternatively, include selecting the composition of the foil, and/or defining a predetermined area of the foil that will be exposed to pressure during use.

The invention also features methods of ultrasonic metal welding.

For example, in one aspect the invention features a method of ultrasonic metal welding comprising (a) using a sonotrode, having at least one weld lobe, to apply welding pressure and ultrasonic vibration to a pair of components to be welded; (b) using a spherical nodal support with a point contact to minimize deflection of the sonotrode; and (c) positioning the nodal support so that the point contact coincides with a plane through a longitudinal axis of the weld lobe and a longitudinal axis of the sonotrode.

In another aspect, the invention features a method of ultrasonic metal welding comprising using a sonotrode, having at least one weld lobe, to apply welding pressure and ultrasonic vibration to a pair of components to be welded, each weld lobe having a surface, facing the components, that includes one or more grooves and/or knurls into which material of the component in contact with the weld lobe can be displaced when welding pressure is applied.

The surface of the weld lobe(s) may be circular, and may include one groove or a plurality of concentric grooves. The weld lobe may also include a resilient gasket.

In a further aspect, the invention features a method of ultrasonic metal welding comprising using a sonotrode, having at least one weld lobe, to apply welding pressure and ultrasonic vibration to a pair of components to be welded, each weld lobe defining an opening and having a resilient gasket positioned within the opening.

The sonotrode may include at least one weld lobe. The sonotrode may further include a channel extending through the sonotrode for communication with a vacuum source.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Battery Structure

Figure 1:
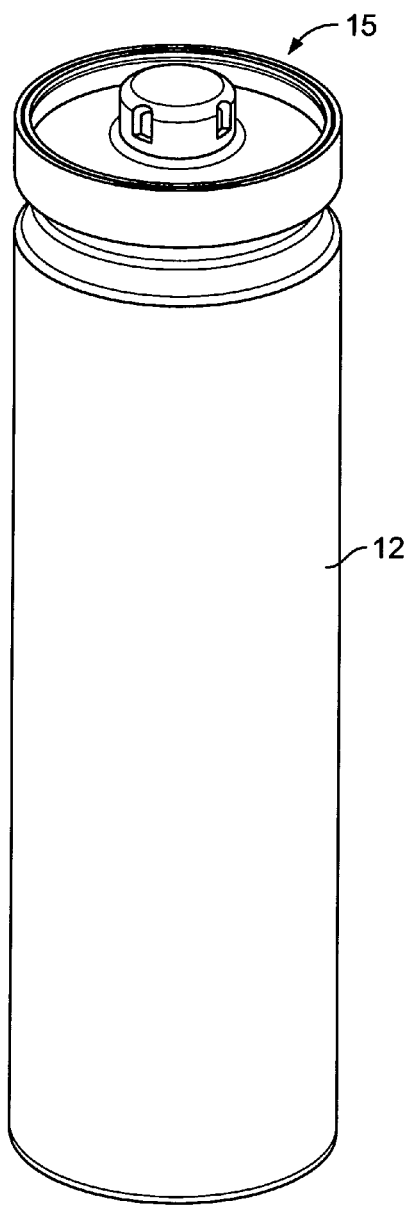
FIG. 1 is a perspective view of a battery housing.
Figure 1A:
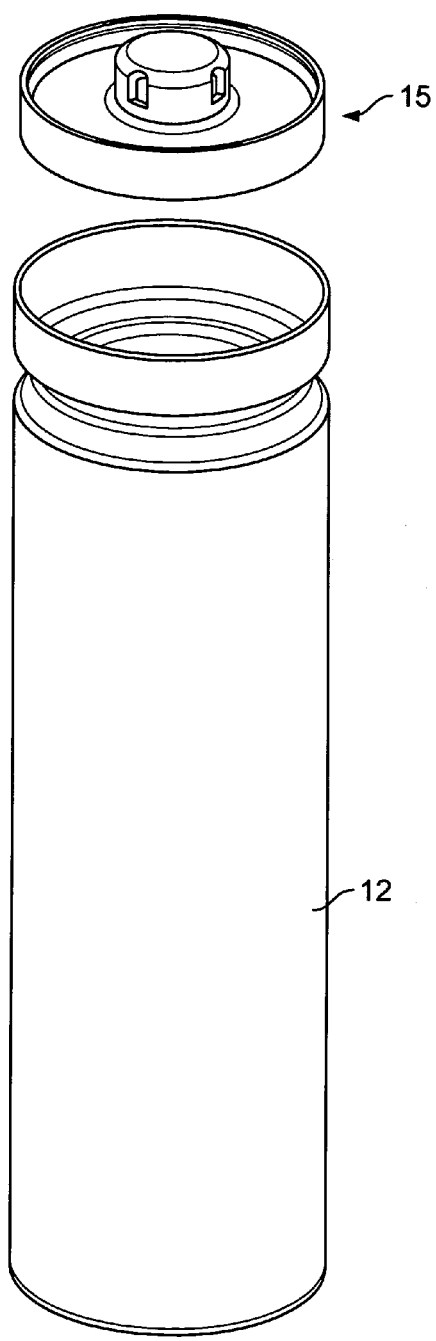
FIG. 1A is an exploded perspective view showing the battery cap assembly exploded from the cylindrical wall of the battery housing.
Figure 1B:
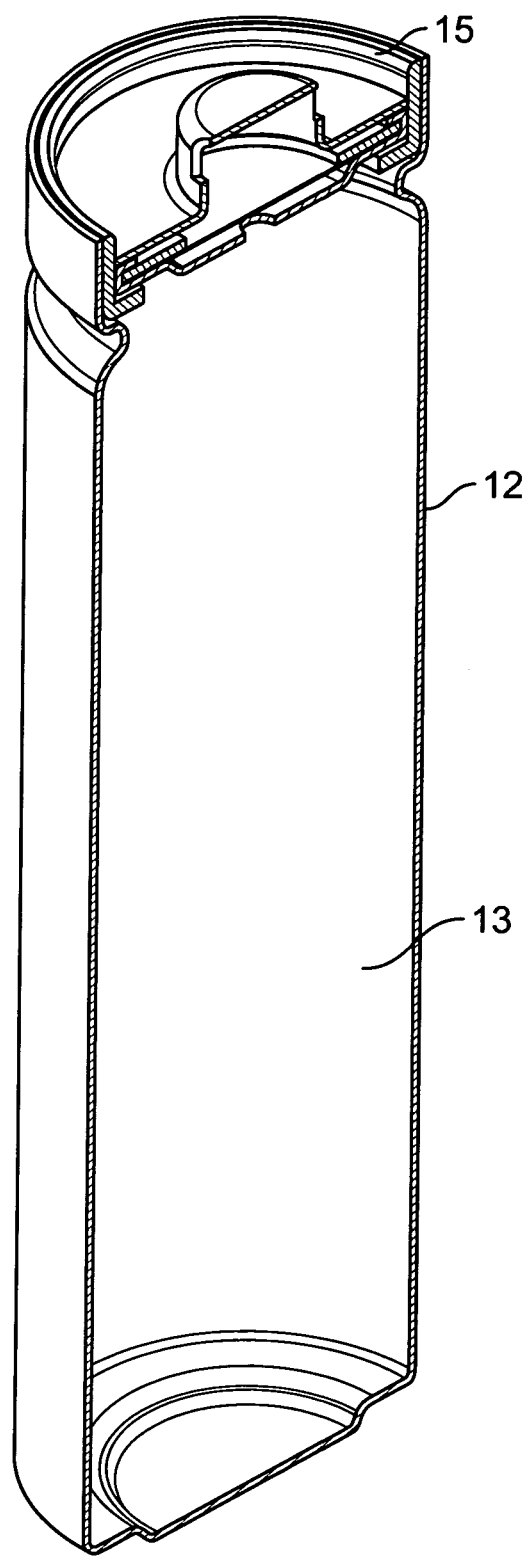
FIG. 1B is an axial cross-sectional view of the battery housing of FIG. 1, showing the interior of the battery cap assembly.

Referring first to FIGS. 1-1B, a cylindrical battery housing 10 includes a cylindrical tube 12, and a cap assembly 15 crimped to the tube 12. Together, the tube 12 and cap assembly 15 define an interior cavity 13 (FIG. 1B). The cylindrical tube (battery can) 12 can be any material commonly used in battery housings, such as Nickel plated cold rolled steel. The cylindrical housing 10 may be used in any desired type of cylindrical battery, e.g., an AA, AAA, AAAA, C, or D battery.

Figures 2, 2A:
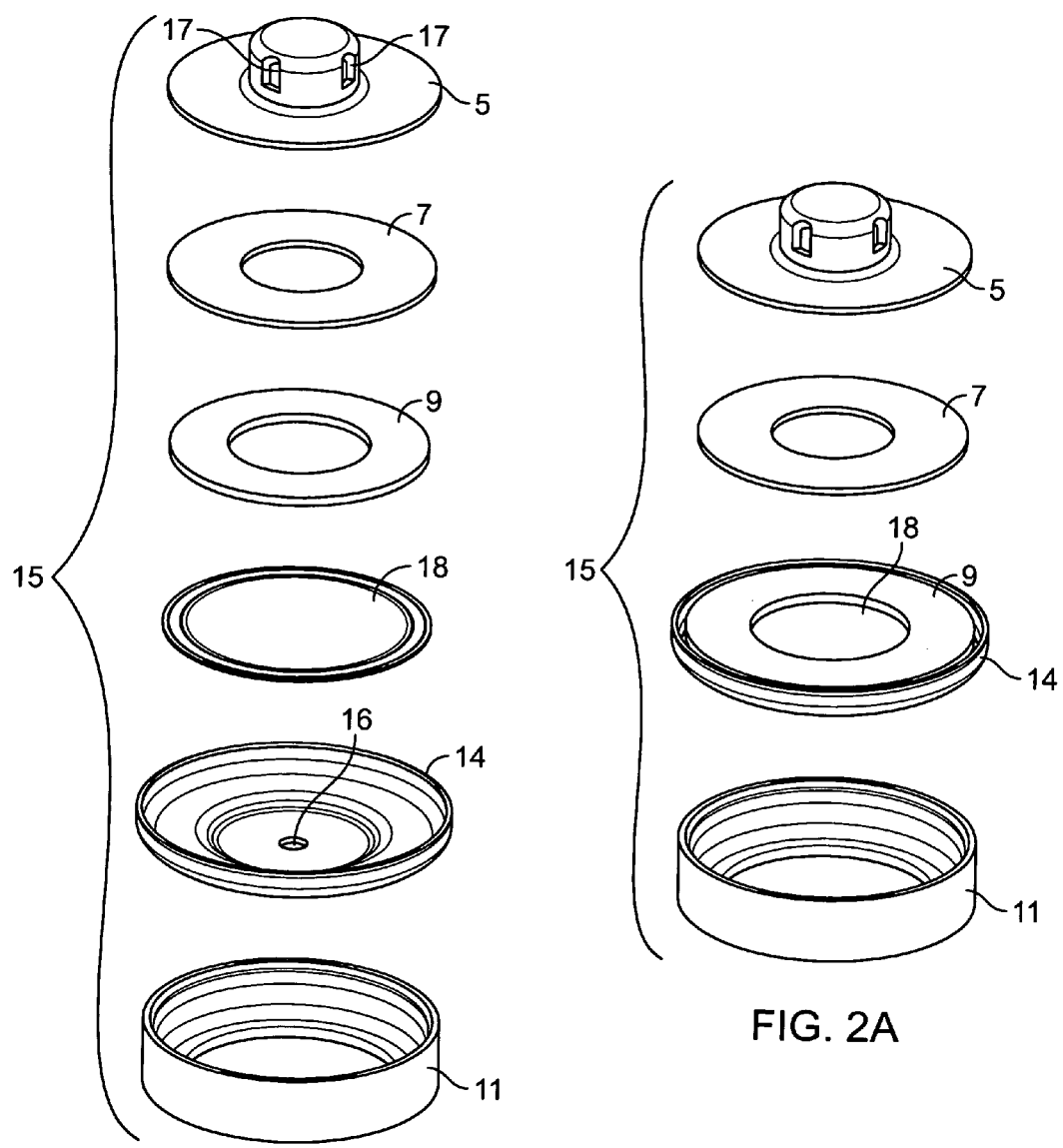
FIG. 2 is an exploded view of the battery cap assembly.
FIG. 2A shows the battery cap assembly partially assembled.

The cap assembly 15, the components of which are shown in FIGS. 2-2A, includes a cup 5, a PTC device 7, a washer 9, a foil 18, a contact cup 14, and a main seal 11 into which the other components are assembled. The PTC device 7 provides a safety feature, as is well known in the battery art. The washer 9 provides a gap, in the axial direction between the foil 18 and the PTC device 7. As a result, the inner diameter of the washer 9 defines the area of the foil 18 that is exposed to pressure from within the cavity 13 and supports the foil to achieve burst at a predetermined pressure.

Contact cup 14 includes a vent opening 16, to allow gas to escape from the battery into an area between the bottom of the contact cup and the foil (not shown). The contact cup is formed of a metal suitable for use as the positive or negative terminal of the battery, typically a non-ferrous metal such as Aluminum. The size of the vent opening in the battery contact cup depends on the rate at which the internal pressure has to be relieved in a given battery configuration. If desired, more than one vent opening may be included.

Figure 3:
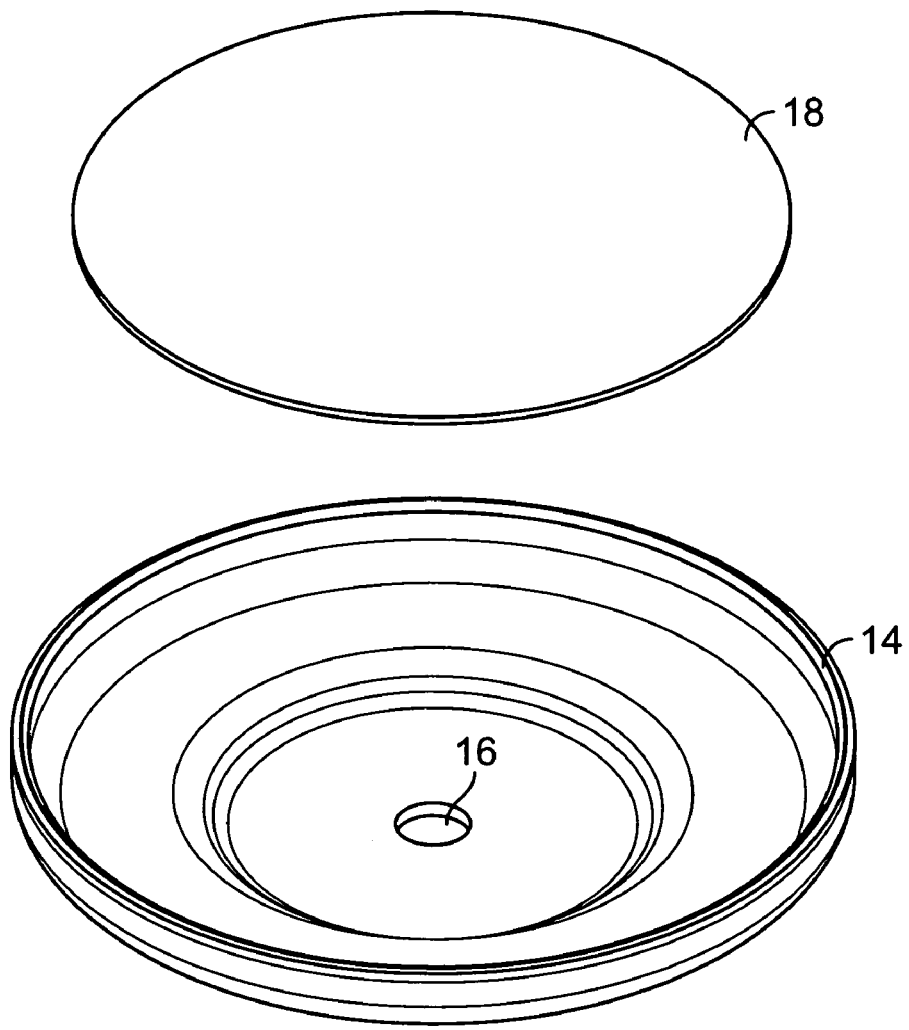
FIG. 3 is an exploded view showing the contact cup and foil prior to welding the foil to the contact cup.
Figure 3A:
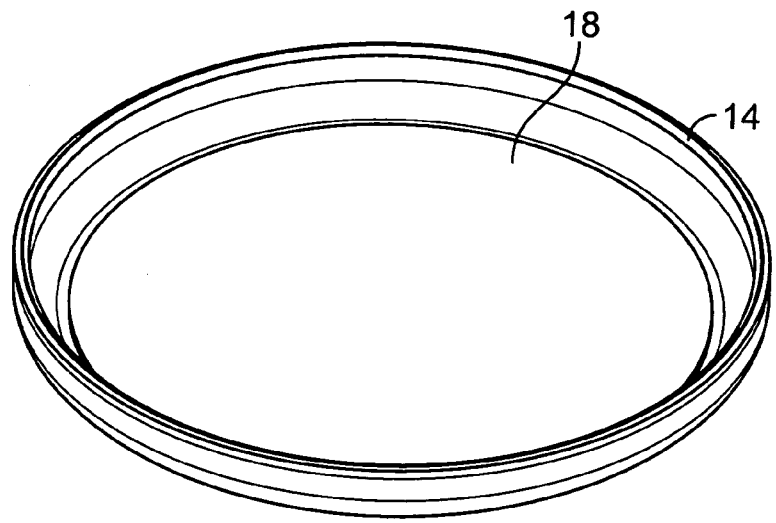
FIG. 3A is a perspective view showing the foil positioned in the contact cup.
Figure 3B:
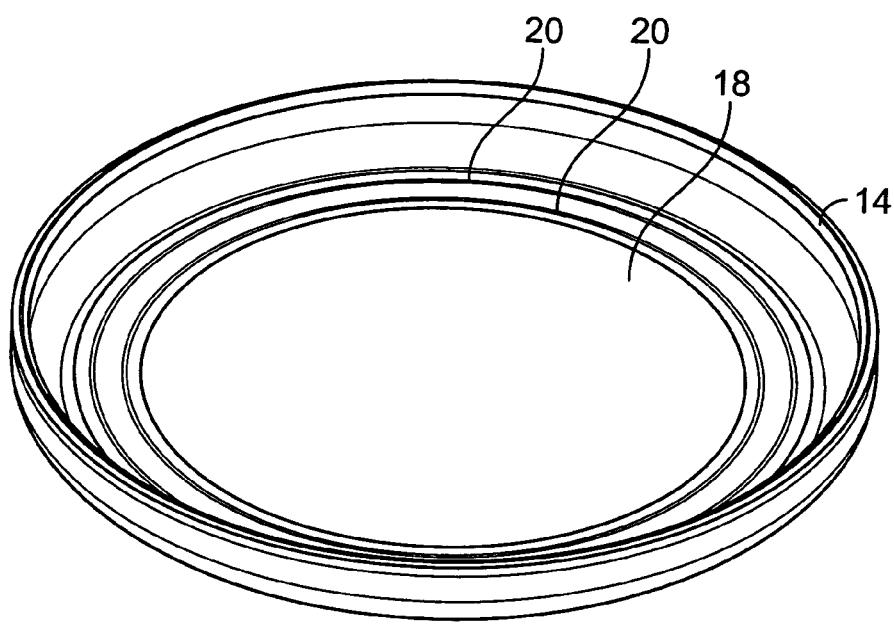
FIGS. 3B and 3C are, respectively, a perspective view and a top view, showing the contact cup with the foil welded to the contact cup.
Figure 3C:
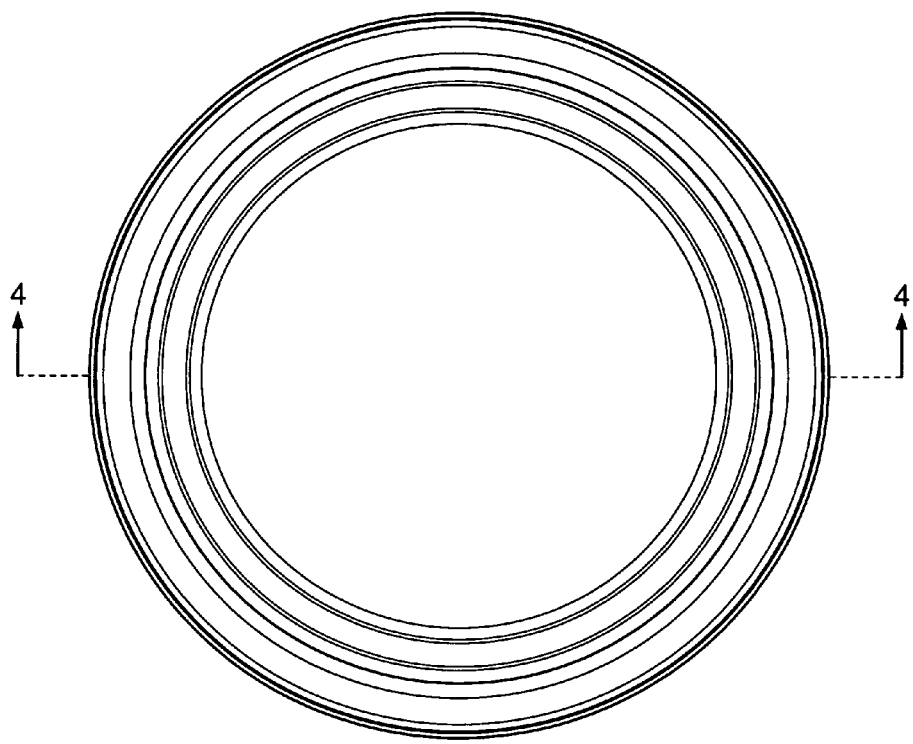

As shown in detail in FIGS. 3-3C, the vent opening 16 of the contact cup 14 is hermetically sealed by a foil 18. Foil 18 is welded to the inner surface of contact cup 14 around the perimeter of the area having vent opening 16, with a circular weld 20 (FIGS. 3B, 3C). The foil may be, for example, an Aluminum foil. Preferred foils will be discussed in detail below. Generally, the foil 18 is welded to the contact cup 14, within a recessed portion of the cup, prior to final battery assembly. For example, as shown in FIG. 2A, the foil may be welded to the contact cup and then the washer 9 crimped into the contact cup to form a sub-assembly that is then assembled into the cap assembly 15.

The weld 20 provides a hermetic seal, preventing the intrusion of water, air or contaminants into the battery through the vent openings and preventing the escape of gas that has vented into the area between the contact cup and the foil. The weld may consist of two concentric rings, as shown in FIGS. 3B and 3C, or fewer or more rings, e.g., one ring, three concentric rings, or more than three rings. The number of rings will be determined by the weld pattern of the sonotrode, as will be discussed in detail below.

When the pressure within the area between the contact cup and foil (and thus the internal pressure of the battery) exceeds a predetermined pressure, the foil will rupture, allowing gas to escape from the battery through openings 17 (FIG. 2) of the cup 5 of the cap assembly.

The weld 20 is preferably sufficiently strong so that the burst pressure at which the seal will be broken is determined by the properties of the foil and the surface area of the foil that is exposed to the pressure. In other words, the seal is preferably strong enough so that the mode of failure at the predetermined burst pressure will be tearing or rupturing of the foil, rather than breaking of the weld. When this is the case, the burst pressure at which the foil ruptures and venting occurs can be very accurately determined based on the characteristics of the foil that is used to form the vent. For example, Aluminum foil 1100-H19, 0.003" (0.08 mm) thick, with a restricted circular surface area having a diameter of 0.25" (6.4 mm) exposed to pressure, can be selected so that the foil will rupture when an average pressure of at least 278 psi is reached within the interior of the battery. In other implementations, the selected average burst pressure may be, for example, 517 psi, 636 psi or 925 psi. The burst pressure of the vent will be determined in part by the properties of the foil that is used. The burst pressure that is required for safety depends on the battery chemistry, battery size, design of the battery components, material properties, and any special requirements. For example, burst pressure for alkaline batteries is generally between 200 and 1800 psi, while for $LiSOCl_2$ batteries burst pressure is generally between 270 and 330 psi.

Preferably, the hermeticity of the weld is such that there is no leakage at the weld at pressures up to the pressure at which the foil ruptures (the burst pressure of the vent). Hermeticity can be tested, for example, using a Helium leak detector such as the leak detector available from Varian under the tradename TURBO 959-50, using the standard test procedure that is specified for this device.

Welding Techniques and Parameters

As discussed above, generally both the contact cup and the foil are non-ferrous metals. We have found that a particularly efficient way to form the weld 20 is by ultrasonic metal welding. Ultrasonic metal welding (UMW) is a solid-state bonding process in which ultrasonic vibrations create a frictional action between surfaces held together under pressure, dispersing interface oxides and contaminants to bring metal-to-metal contact and creating a bonding (diffusion) process between the surfaces. An ultrasonic weld is formed between two metal parts when frequency vibrations are propagated to the interface of the two metals while they are held together under moderate pressure. One of the metal parts is held stationary, while the other part is vibrated at an ultrasonic frequency. Unlike other welding processes, UMW creates negligible internal stresses because the maximum temperature at the welding interface generally does not exceed 35 to 50% of the melting temperatures of the metals being welded. This is advantageous in the present battery manufacturing process, as it is undesirable to induce excessive thermal stress in the battery components.

UMW equipment is commercially available, e.g., from AmTech, Stapla, Dukane, Sonobond Ultrasonics, Mecasonic, as well as other suppliers. One suitable UMW system is available under the tradename ULTRAWELD-20 from AmTech, Inc. This system operates at 20 kHz, and can utilize a full wave (λ) sonotrode, where λ is equivalent to one complete harmonic wavelength. It is generally preferred that the weld pressure be relatively low. Suitable welding pressures will depend on the parts to be welded and the welding system and sonotrode used. For example, for an AA size battery, using an Ultraweld-20 UMW system from AmTech and a sonotrode similar to that illustrated in FIGS. 5-5B and described herein, it is generally preferred that the welding pressure be less than 2000 psi, e.g., 550 to 1500 psi, which equates to clamping force of 40 to 110 lbs.

Figure 4:
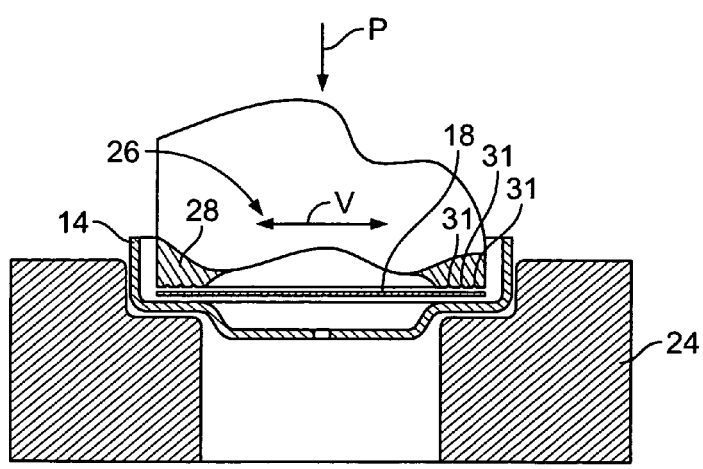
FIG. 4 is a diagrammatic cross-sectional view, taken along line 4-4 in FIG. 3C, showing a foil being bonded to a contact cup using ultrasonic metal welding.

The foil may be welded to the cup using UMW as shown in FIG. 4. The contact cup 14, with the foil 18 inside of it, is held in a fixture (also called anvil or weld nest) 24. The fixture holds the contact cup while the sonotrode 26 is activated to deliver ultrasonic vibrations to the cup and foil through a lobe 28 that clamps against the upper surface of the foil 18 and applies a downward welding pressure (arrow P) thereto. When sonotrode 26 is activated, vibration occurs, as indicated by arrows V, forming the weld 20 described above.

Figure 5:
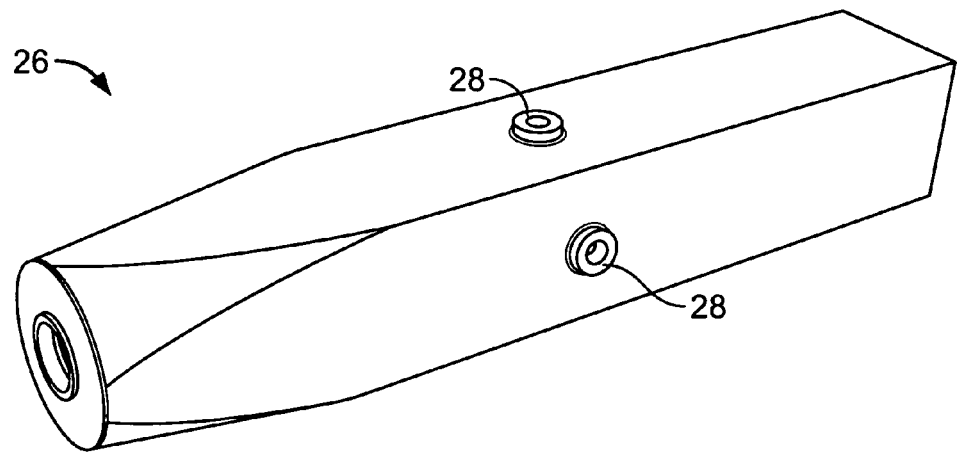
FIG. 5 is a perspective view of a sonotrode suitable for use in ultrasonically welding the foil vent to the battery contact cup as shown in FIG. 4.
Figure 5A:
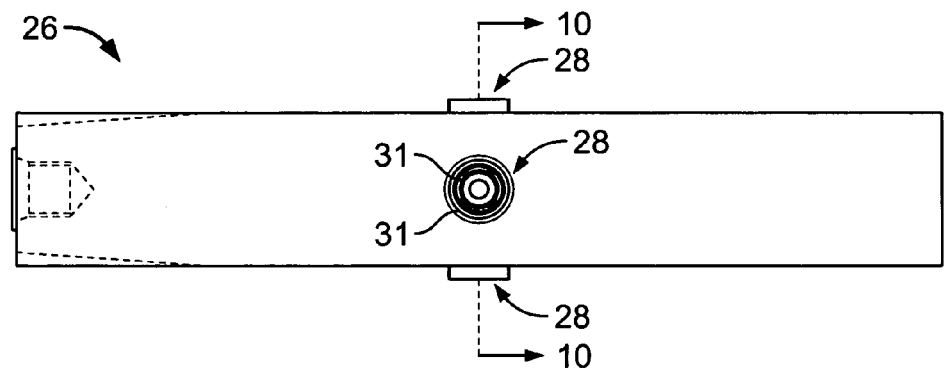
FIG. 5A is a front view of the sonotrode.
Figure 5B:
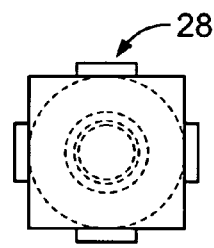
FIG. 5B is a side view of FIG. 5A.

A design of a sonotrode 26 that is suitable for use in some implementations is shown in FIGS. 5-5B. This is a full wave sonotrode, with weld lobes 28 positioned at the central maximum amplitude plane (λ/2), and thus provides axis-symmetrical amplitude in the work zone, allowing a hermetic weld to be formed. The sonotrode may include one or more weld lobes. The sonotrode shown in FIG. 5 includes four weld lobes, each having a smooth surface that functions as an energy director, and one or more closed circular grooves 31 (e.g., two concentric grooves, as shown in FIGS. 5A and 6A) recessed into the surface. When pressure (P) and ultrasonic vibration (V) are applied as shown in FIG. 4, the material of the foil is displaced. This displaced material flows into the groove(s) 31, which by design increases the efficiency of the transfer of ultrasonic energy from the sonotrode to the weld area. Flow of the displaced material into the grooves also serves to hold the foil in place during welding. As the groove(s) fill with material, a compressional force is created by the tool geometry that increases the weld projection surface by utilizing the area under the displaced material. Because the surfaces to which most of the welding pressure is applied are smooth, the thin foil material is protected from tearing or puncturing during welding (as could occur if these surfaces included sharp protrusions).

Figure 7:
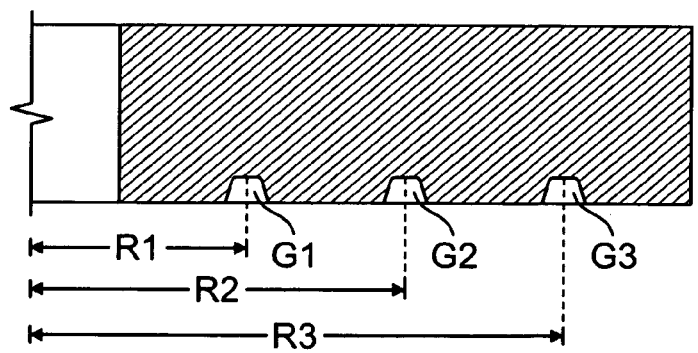
FIG. 7 is a cross-sectional view of a portion of the sonotrode shown in FIG. 6B, with a diagram indicating how to use Guldin's Second Theorem to calculate the groove profile parameters in the weld pattern.

The internal volume of the groove(s) ($V_g$) is preferably greater than the volume of material displaced during welding ($V_{dm}$), and can be calculated according to Guldin's Second Theorem. Referring to FIG. 7, the area (G1, G2, G3) of the groove(s) 31 in the plane through the axis of rotation (O-O) may be calculated according to the following equation, in which R1, R2 and R3 are the radii of rotation to the center of gravity of each groove:

$$V_g = 2\pi \times (G1 \times R1 + G2 \times R2 + G3 \times R3)$$

Sonotrode design is based on the particular materials used, geometry of components, dimensional stability of the parts, and other considerations, based on principles understood by those of skill in the UMW art. Accordingly, it should be understood that the tool geometries discussed herein can be modified to apply the same principles to other component geometries and other applications.

Figure 6:
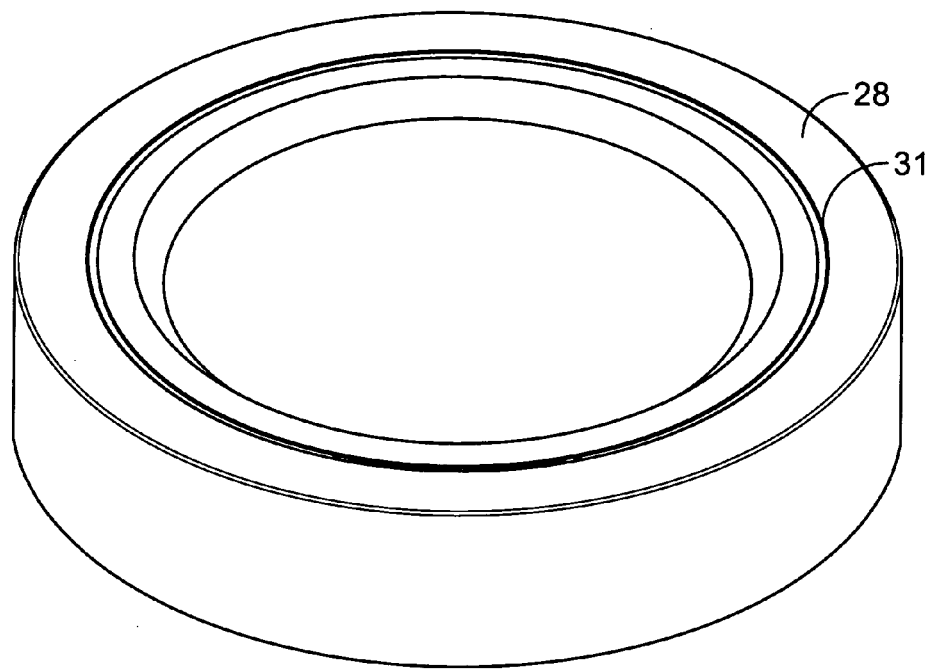
FIGS. 6, 6A and 6B are perspective views showing the weld lobes of sonotrodes having various weld patterns used to weld thin aluminum foils (up to 0.0035" (0.09 mm) thick).
Figure 6A:
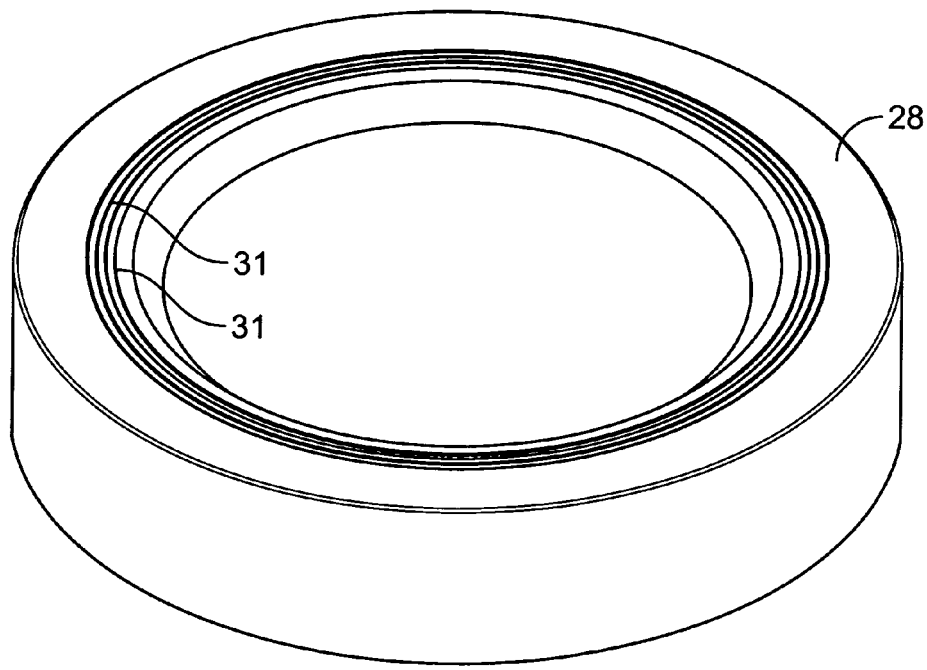
Figure 6B:
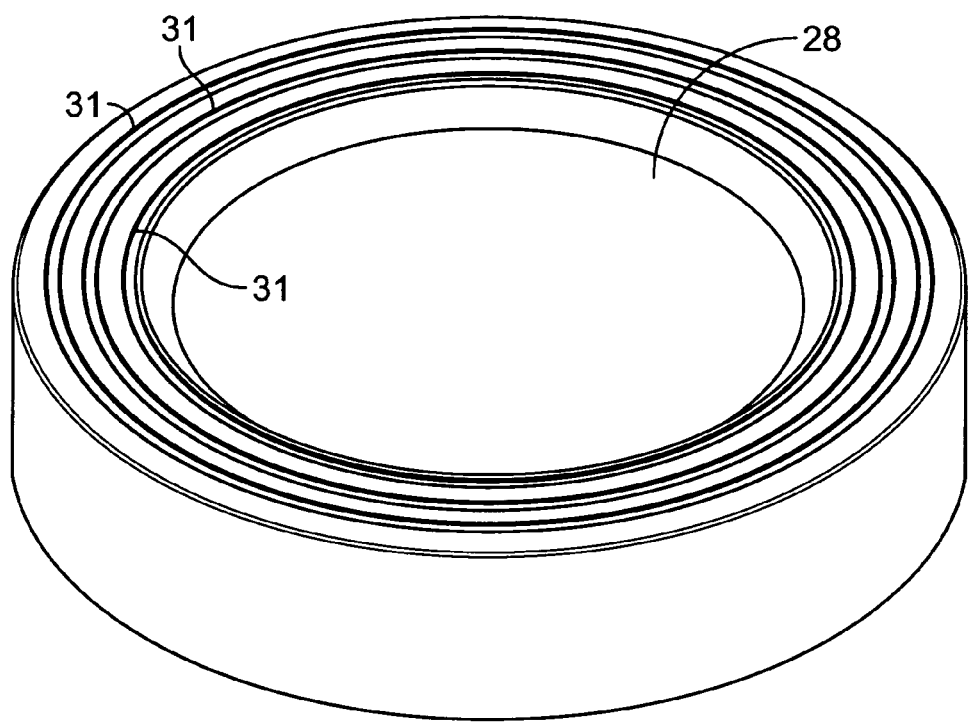
Figure 8:
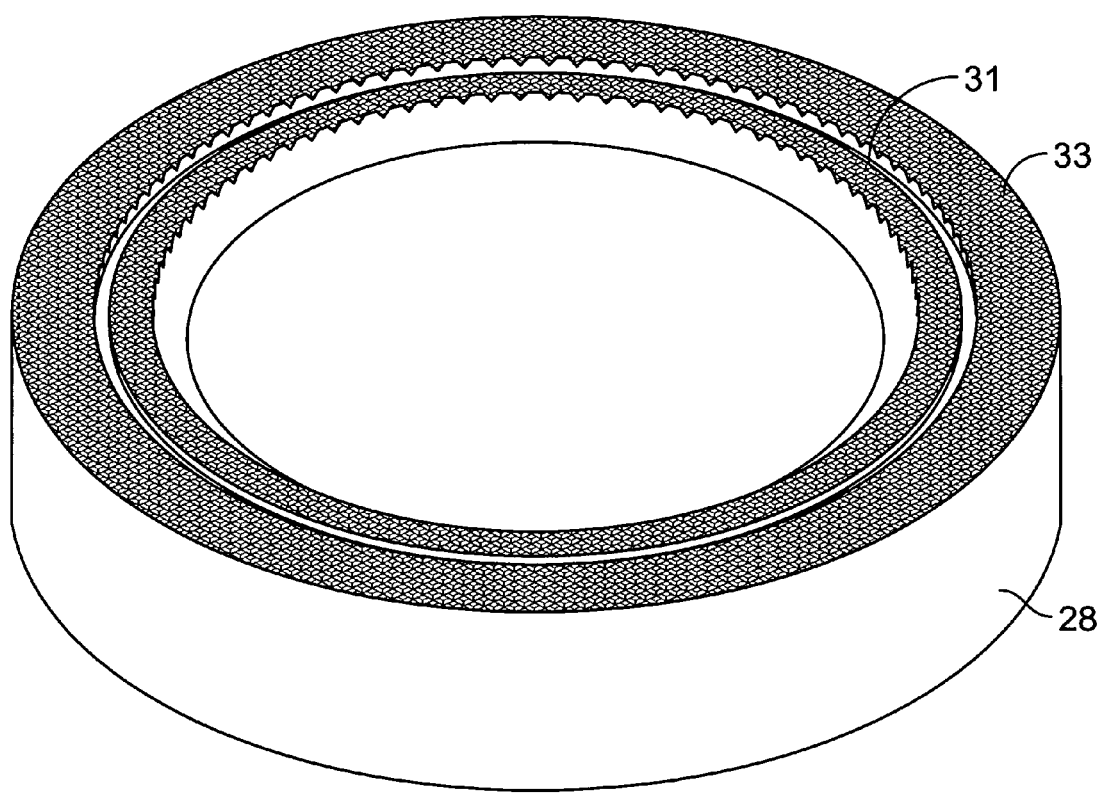
FIG. 8 shows a weld lobe having a weld pattern with one groove and textured serrations, used to weld a relatively thicker aluminum foil.

The lobe designs shown in FIGS. 6-6B provide an acceptable weld when the foil is relatively thin, e.g., less than about 0.0035" (0.09 mm). When the foil is thicker than about 0.0035" (0.09 mm), the weld pattern may further include a knurled pattern 33 as shown in FIG. 8. The thicker foil can better withstand pressure applied by the knurls (rather than by a smooth, flat surface) without perforating and creating pinholes in the foil. The knurled pattern 33 maximizes the contact surface area between the sonotrode and the weldment, to produce energy transformation and achieve a hermetic weld having the desired strength. The geometry of the weld pattern is described by defining knurl depth, pitch, intersecting angle and inclusive angle. To achieve a hermetic seal and insure the weld pattern does not produce pinholes, the knurl depth should not exceed 50% of the thickness of the foil material. Design of the knurl pitch, intersecting angle and inclusive angle are dependant upon the physical properties of the weldment material (i.e. its hardness, thickness, composition etc.).

In order to obtain a hermetic seal, it is generally necessary that the surfaces to be welded are flat and parallel. Generally, the components being welded should be held sufficiently parallel so that the deviation from parallelism is less than 10% of the thickness of the foil. (Deviation from parallelism is determined by measuring the distance between the opposed surfaces of the foil and contact cup at each end of the weld zone (i.e., at the opposite ends of the diameter if the weld zone is circular) and taking the difference between these two measurements.)

In some implementations, the surface of the contact cup that is to be welded is not sufficiently flat to obtain the desired (or necessary) degree of parallelism. Our testing has shown that, particularly in these cases, holding the contact cup loosely in the weld nest increased weld integrity. We determined that by loosely holding the contact cup, the weld system compensated for camber in the contact cup, thus allowing the contact cup to deflect toward a flat configuration under initial welding pressure (generally movement of the contact cup occurs prior to stabilization of the welding process, after which the contact cup no longer moves). This dynamic compensation tends to increase the parallelism between the weld surfaces. Further testing showed that in order to achieve the desired weld results, the best conditions were achieved when the clearance between the contact cup 14 and the weld nest 24 was defined with the formula: $D1-D2 \leq \xi$, where $D1$ is the ID of the weld nest 24, $D2$ is the OD of the contact cup 14, and $\xi$ is the amplitude of the sonotrode 26. We have found the difference between the diameter of the weld nest and that of the contact cup generally should not exceed the amplitude of vibration of the sonotrode. In one implementation, for example, the amplitude of sonotrode was 22 μm and the clearance was 20 μm. The extent to which the diameter of the weld nest exceeds that of the contact cup will depend on the degree to which the area of the contact cup to be welded is non-planar.

In order to prevent aluminum build-up, and component marking, the contact surface of the weld fixture and the contact surface of the sonotrode should generally have minimum surface roughness and be coated, for example, with diamond-like carbon (DLC) to lower the coefficient of friction between contacting surfaces. DLC coatings may be provided on metal parts, for example, by Balzers Inc. (www.balzers.com). Other suitable coatings include low coefficient of friction coatings that will prevent aluminum deposition and enhance wear resistance, for example titanium nitrate, carbon nitrate, chromium nitrate, and other coatings having similar properties.

Figure 9:
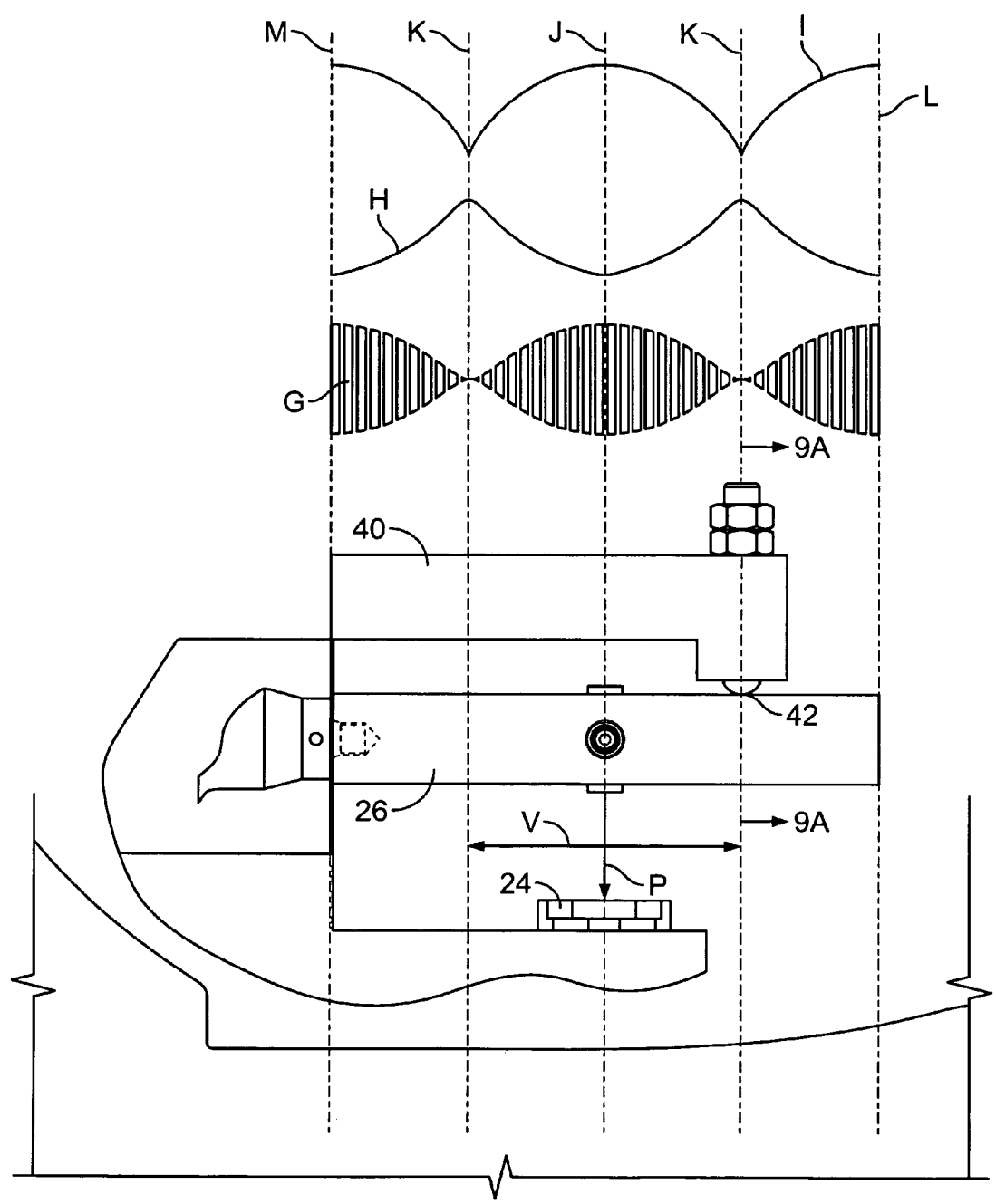
FIG. 9 is a diagrammatic side view of an ultrasonic welding device including a nodal support, with graphs of the longitudinal motion of the sonotrode, stress on the sonotrode, and amplitude of the harmonic wave propagated through the sonotrode provided above the device.
Figure 9A:
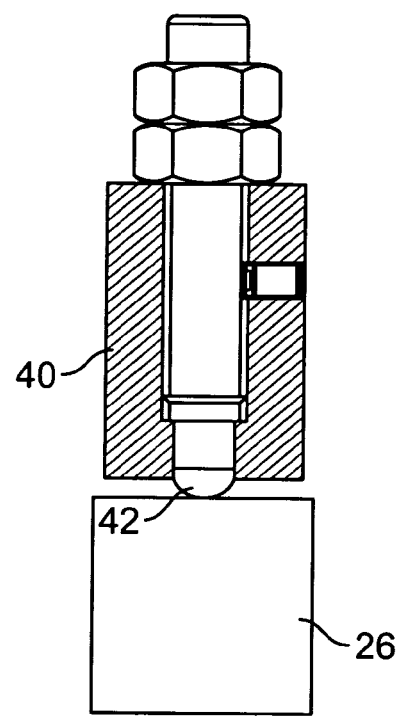
FIG. 9A is a cross-sectional view taken along line A-A in FIG. 9.

In order to minimize deflection of the sonotrode, which if unsupported tends to move upwards under welding pressure, potentially impacting the parallel relationship and correct registration between the foil and the contact cup, the UMW system may be provided with a nodal support mechanism, e.g., as shown in FIG. 9. Preferably, the point of contact of the nodal support 40 with the sonotrode 26 is positioned at a location K along the length of the sonotrode 26 that is equal to one quarter of the harmonic wavelength ($\lambda/4$) from the end of sonotrode as shown in FIGS. 9 and 9A. In preferred implementations, the contact point between the nodal support and the sonotrode coincides with the plane defined by the longitudinal axis of the weld lobe and the longitudinal axis of the sonotrode, in order to prevent an additional rotational moment which would impact the parallelism between the sonotrode, the foil and the contact cup. The portion of the nodal support 40 that contacts the sonotrode preferably has a spherical end 42 with a single tangent point contact, to maximize weld efficiency by minimizing ultrasonic energy absorbed by the nodal support. The legend for the graphs shown above the device in FIG. 9 is as follows:

G: Compressional Longitudinal Harmonic wave propagated through the sonotrode
H: Stress Dispersement
I: Amplitude Displacement
J: Harmonic Antinode ($\lambda/2$)
K: Harmonic Node ($\lambda/4$)
L: Full Wave ($\lambda$)
M: Plane of the wave start ($\lambda=0$)

It is noted that the point of contact for the nodal support is positioned to coincide with the point of minimum harmonic amplitude $\lambda/4$ (where the sonotrode has substantially zero motion) so that the energy loss as a result of the nodal support is minimized.

Preferably, welding is conducted by welding to a pre-determined energy. However, weld controls can weld in several other modes, all capable of providing adequate welds, such as, weld to time, weld to height, weld to power, etc. In some implementations, for example welding is performed in energy mode from 40 to 80 joules. When operating at 20 kHz, the amplitude of vibration is generally in the range of about 10 to 80 μm, while when operating at 40 kHz the amplitude is generally about 1 to 35 μm. The major weld process parameters in energy mode are: energy, pressure, and amplitude. Additional weld parameters that generally have less effect on the weld may include: trigger pressure, squeeze time, hold time, after burst delay, and after burst time. The welder may also monitor weld time and weld power as quality factors.

Figure 10:
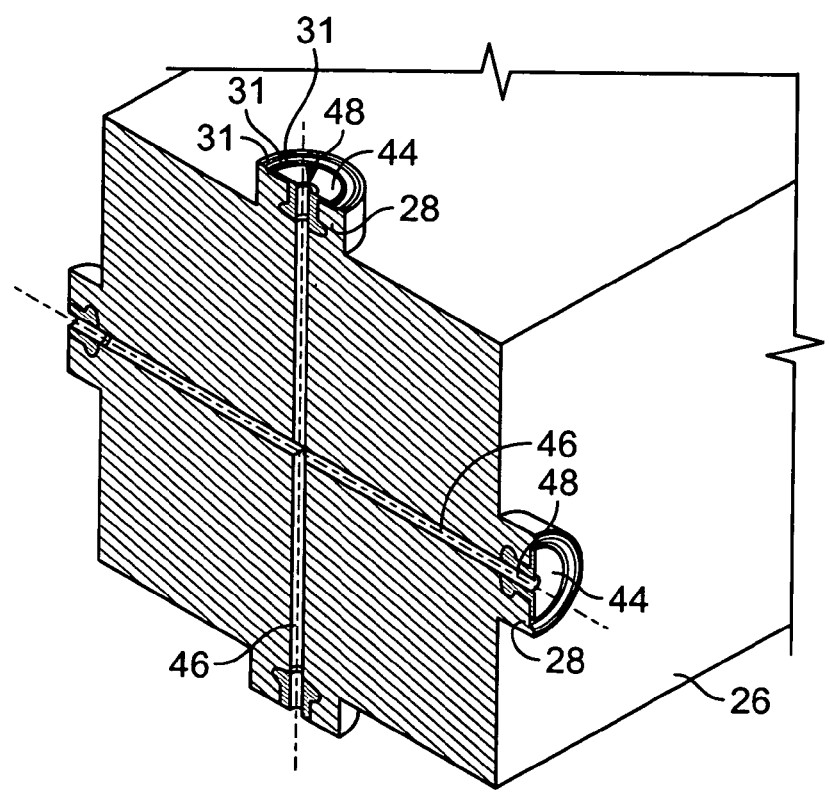
FIG. 10 is a perspective view of a sonotrode, cross-sectioned along line 10-10 in FIG. 5A.
Figure 10A:
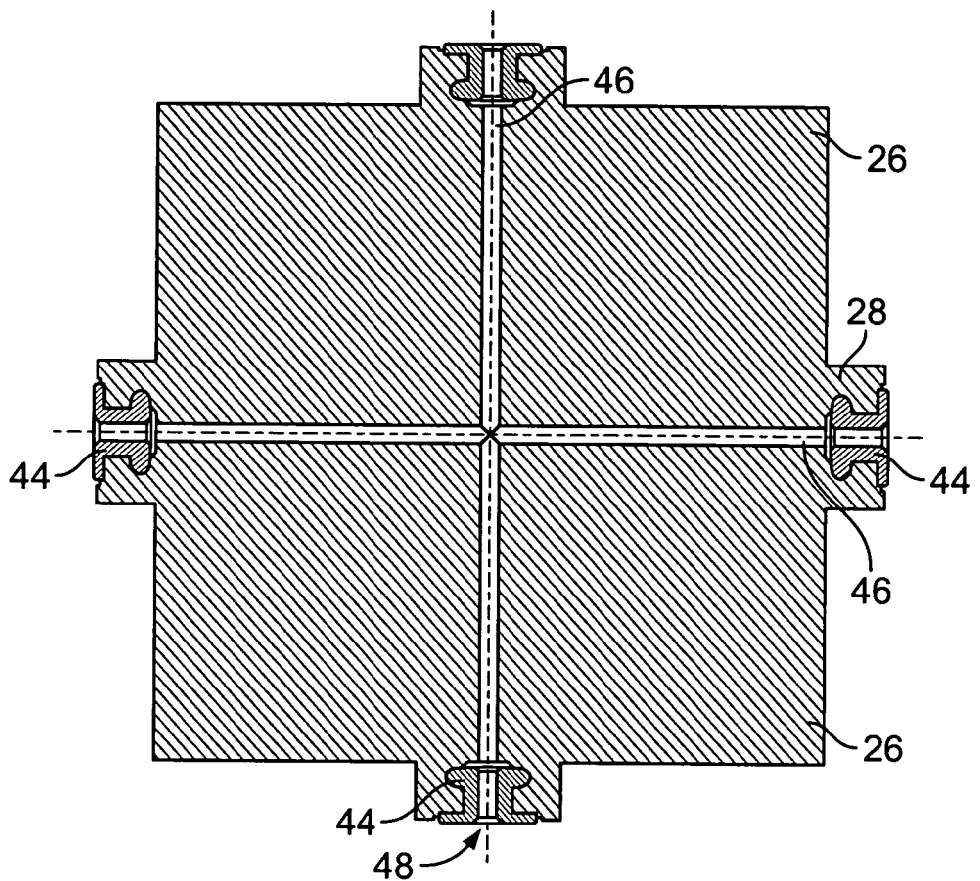
FIG. 10A is a front view of the cross-section shown in FIG. 10.
Figure 10B:
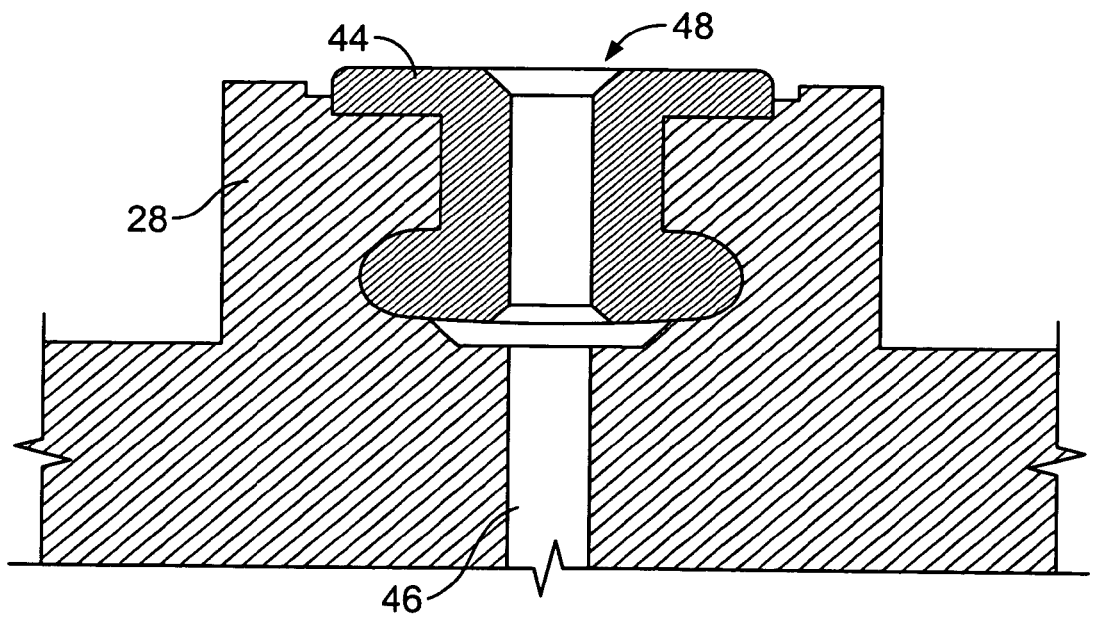
FIG. 10B is an enlarged view of one of the nodes of the sonotrode shown in FIGS. 10-10A.

Preferably, the sonotrode includes gaskets to dampen unwanted vibrations. A sonotrode design with dampening gaskets 44 inserted in the lobes 28 is shown in FIGS. 10-10B.

The gaskets perform several functions. From the standpoint of optimizing the quality of the weld, the gaskets prevent the thin foil from deflecting and distorting during welding, thereby preventing the foil from becoming wrinkled or wavy. The gasket also absorbs dispersed sonic energy in the non-welding zone during welding.

From a manufacturing standpoint, the gasket provides a vacuum seal for holding and placing the foil vent in the contact cup. For example, the gasket may extend out of the lobe outer surface a short distance, e.g., about 0.003"-0.006" (0.076 to 0.15 mm). In one implementation, the sonotrode picks up the top foil in an oriented stack (e.g., carried by a retractable robotic arm) by a vacuum applied through channels 46 and holes 48 in each lobe. The stack is then moved from the working zone by retraction of the arm, and the sonotrode places and clamps the foil inside the contact cup. Before the weld process starts the vacuum line shuts off, resulting in ambient pressure on both sides of foil.

The gasket can be fabricated of rubber or elastomer materials with low hardness (preferably durometer 35-50, shore A), high unreinforced strength, low compression set and stress relaxation, and good abrasion resistance. Suitable materials include, for instance, Natural Rubber; synthetic rubbers such as nitrile rubber, Neoprene, butyl rubber (polyisobutylene), and thermoplastic elastomers such as Santoprene® elastomer (ExxonMobil Chemical).

Materials

As discussed above, the contact cup and foil are generally both non-ferrous metals. The contact cup is selected to have a conductivity suitable for use in a battery top assembly, and physical properties suitable to allow it to be sealingly joined to the cylindrical tube (battery can). If the contact cup and foil are to be joined by UMW, as discussed above, the materials of the contact cup and foil need to be compatible so as to allow a bond to be formed by UMW.

The contact cup generally has a wall thickness of from about 0.24 to 0.26 mm. The contact cup may be formed of aluminum, for example 5052H38 Aluminum. In some implementations, the foil is formed of the same aluminum alloy as the contact cup; however it is not necessary to use the same type of foil material for UMW. Other suitable aluminum alloys that may be used to form the contact cup and/or the foil can include, for instance, 1100, 1145 and 3003 aluminums and other aluminum alloys. Other metals may be used, provided they are compatible with each other for UMW and are suitable for use in the particular battery application.

The preferred thickness of the foil is determined based on the required burst pressure, design parameters of the components used, and the physical properties of the metal used. Generally, suitable thicknesses may be in the range of about 0.02 to 0.25 mm. The thickness that will provide a desired burst pressure in a particular application will depend upon the physical properties of the metal. For example, 5052-H19 Aluminum and 1100-H19 Aluminum, each having a foil thickness of about 0.076 mm (0.003 inch) will give an average burst pressure of about 925 and 278 psi, respectively, when the foil is welded to an aluminum contact cup using the UMW techniques described above.

The finished battery will include a positive electrode, a negative electrode, and a separator between the electrodes. The battery may also include a current collector and an electrolytic solution dispersed throughout the interior space of the battery.

As discussed above, the cylindrical tube 12 can be of any material commonly used in housings for batteries. In some embodiments, the cylindrical tube 12 includes an inner metal wall and an outer electrically non-conductive material such as heat shrinkable plastic.

The battery can be assembled using conventional methods.

Other Embodiments

A number of embodiments of the invention have been described. Nevertheless, it will be understood that various modifications may be made without departing from the spirit and scope of the invention.

For example, other types of welding sonotrodes and other welding parameters may be used, depending on the particular application, e.g., the geometry and chemistry of the parts to be welded.

Moreover, the vents and welding processes discussed herein may be used with other types of batteries in addition to cylindrical batteries.

Additionally, the ultrasonic welding techniques described herein, for example the positioning of the nodal support and the use of grooves on the sonotrode weld lobe(s), may be used to weld foils in applications other than battery manufacture.

Accordingly, other embodiments are within the scope of the following claims.

What is claimed is:

1. A sealed battery comprising
    active battery components, including a positive electrode, a negative electrode, a separator interposed between the positive and negative electrodes, and an electrolyte solution;
    a metal housing defining an interior cavity containing the active battery components;
    a contact cup joined sealingly to an end of the metal housing, the contact cup including a recessed portion and a vent hole within the recessed portion; and
    a foil, positioned within the recessed portion and attached to the contact cup within the recessed portion so as to seal the vent hole.

2. The battery of claim 1 wherein the foil is attached within the recessed portion the contact cup by a weld.

3. The battery of claim 2 wherein the weld is generally circular.

4. The battery of claim 2 wherein the weld forms a hermetic seal.

5. The battery of claim 1 wherein the foil has a thickness of from about 0.02 to 0.25 mm.

6. The battery of claim 1 wherein the foil is configured to rupture when a predetermined pressure is reached within the interior cavity.

7. The battery of claim 1 wherein the contact cup and foil are formed of non-ferrous metals.

8. The battery of claim 1 wherein the metal housing is generally cylindrical.

9. The battery of claim 1 wherein the recessed portion has a perimeter and the foil is sealed around the perimeter of the recessed portion.

10. The battery of claim 1, wherein the cap assembly further includes a PTC device.

11. A method of manufacturing a sealed battery, the method comprising:
    providing a metal contact cup including a recessed portion and at least one vent opening within the recessed portion;
    positioning a foil within the recessed portion;
    sealing the foil to the contact cup within the recessed portion so as to seal the opening;
    providing a battery housing; and
    joining the contact cup to the housing.

12. The method of claim 11 wherein the sealing step comprises welding the foil to the contact cup within the recessed portion.

13. The method of claim 12 wherein welding comprises forming a circular weld.

14. The method of claim 12 wherein welding is conducted in a manner so as to form a hermetic seal.

15. The method of claim 12 wherein the recessed portion has a perimeter, and the sealing step comprises sealing around the perimeter of the recessed portion.

16. The method of claim 12 wherein welding comprises ultrasonic metal welding utilizing a sonotrode having at least one weld lobe.

17. The method of claim 16 wherein ultrasonic metal welding is conducted using a full wave sonotrode.

18. The method of claim 16 wherein ultrasonic metal welding is performed using a weld pattern comprising grooves and/or knurls.

19. The method of claim 18 further comprising optimizing the geometry of the grooves so that the internal volume of the groove(s) ($V_g$) is greater than the volume of material displaced during welding.

20. The method of claim 16 wherein ultrasonic metal welding is performed using a weld nest that allows the contact cup to initially move laterally during welding, prior to stabilization of the welding process.

21. The method of claim 20 wherein the weld nest holds the contact cup loosely to dynamically compensate for camber of the contact cup prior to stabilization of the welding process.

22. The method of claim 20 wherein the weld nest has at least a polished surface and a low coefficient of friction coating.

23. The method of claim 16 wherein ultrasonic metal welding is performed using a spherical nodal support with a point contact to minimize deflection of the sonotrode.

24. The method of claim 23 wherein the nodal support is positioned so that the point contact coincides with a plane defined by the longitudinal axis of the weld lobe and the longitudinal axis of the sonotrode.

25. The method of claim 11 further comprising assembling the contact cup and vent into a cap assembly.

26. The method of claim 16 wherein the foil has a predetermined thickness, and the method further comprises, during ultrasonic metal welding, holding the opposed surfaces of the foil and contact cup sufficiently parallel so that the deviation from parallelism is less than 10% of the thickness of the foil.

27. The method of claim 16 wherein the weld lobe includes a resilient gasket.

28. The method of claim 25 wherein the cap assembly further comprises a PTC device and a spacer including an aperture which defines the surface area of the foil that is exposed to pressure.

29. A method of venting a sealed battery, the method comprising:
providing a battery housing having a contact cup having a recessed portion with a vent opening;
sealing the vent opening with a metal foil positioned within the recessed portion;
configuring the metal foil so that it will rupture when a predetermined pressure is reached within the sealed battery; and
selecting process parameters for the sealing step so that the seal will be hermetic as long as the pressure within the sealed battery is at or below the predetermined pressure.

30. The method of claim 29 wherein the configuring step includes selecting the thickness of the foil.

31. The method of claim 29 wherein the configuring step includes selecting the composition of the foil.

32. The method of claim 29 wherein the configuring step includes defining a predetermined area of the foil that will be exposed to pressure during use.

33. A method of ultrasonic metal welding comprising
using a sonotrode, having at least one weld lobe, to apply welding pressure and ultrasonic vibration to a pair of components to be welded;
using a spherical nodal support with a point contact to minimize deflection of the sonotrode; and
positioning the nodal support so that the point contact coincides with a plane through a longitudinal axis of the weld lobe and a longitudinal axis of the sonotrode.

34. A method of ultrasonic metal welding comprising
using a sonotrode, having at least one weld lobe including a resilient gasket, to apply welding pressure and ultrasonic vibration to a pair of components to be welded;
each weld lobe having a surface that includes one or more grooves into which material of the component in contact with the weld lobe can be displaced when welding pressure and vibration is applied.

35. The method of claim 34 wherein the surface of the weld lobe is circular, and comprises concentric grooves.

36. A method of ultrasonic metal welding comprising
using a sonotrode, having at least one weld lobe, to apply welding pressure and ultrasonic vibration to a pair of components to be welded;
each weld lobe defining an opening and having a resilient gasket positioned within the opening.

37. The method of claim 36 wherein the sonotrode includes a channel extending through the sonotrode from the opening of the weld lobe for communication with a vacuum source.

38. A method of ultrasonic metal welding comprising
using a sonotrode, having at least one weld lobe having a surface that is circular and comprises concentric grooves, to apply welding pressure and ultrasonic vibration to a pair of components to be welded;
each weld lobe having a surface that includes one or more grooves into which material of the component in contact with the weld lobe can be displaced when welding pressure and vibration is applied.

39. A method of manufacturing a sealed battery, the method comprising:
providing a metal contact cup defining at least one vent opening;
sealing the foil to the contact cup by ultrasonic metal welding utilizing a sonotrode having at least one weld lobe so as to seal the opening;
providing a battery housing; and
joining the contact cup to the housing.

40. A method of manufacturing a sealed battery, the method comprising:
providing a metal contact cup defining at least one vent opening;
sealing the foil to the contact cup so as to seal the opening;
providing a battery housing;
joining the contact cup to the housing; and
assembling the contact cup, the foil, and a spacer including an aperture which defines the surface area of the foil that is exposed to pressure into a cap assembly.

41. The method of claim 40, wherein the cap assembly also includes a PTC device.

42. A sealed battery comprising
active battery components, including a positive electrode, a negative electrode, a separator interposed between the positive and negative electrodes, and an electrolyte solution;
a metal housing defining an interior cavity containing the active battery components; and a cap assembly comprising
- a contact cup joined sealingly to an end of the metal housing, the contact cup including a vent hole;
- a foil, attached to the contact cup so as to seal the vent hole; and
- a spacer, positioned over the foil, including an aperture which defines the surface area of the foil that is exposed.

43. A method of venting a sealed battery, the method comprising:
- providing the battery housing having a recessed portion with a vent opening;
- sealing the vent opening with a metal foil positioned within the recessed portion;
- positioning a spacer over the metal foil within the recessed portion, the spacer having an aperture which defines the surface area of the foil that is exposed to pressure;
- configuring the metal foil so that it will rupture when a predetermined pressure is reached within the sealed battery; and
- selecting process parameters for the sealing step so that the seal will be hermetic as long as the pressure within the sealed battery is at or below the predetermined pressure.

* * * * *

UNITED STATES PATENT AND TRADEMARK OFFICE
CERTIFICATE OF CORRECTION

PATENT NO. : 7,666,541 B2
APPLICATION NO. : 11/592628
DATED : February 23, 2010
INVENTOR(S) : Makovetski et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 669 days.

Signed and Sealed this

Seventh Day of December, 2010

David J. Kappos
*Director of the United States Patent and Trademark Office*